(12) United States Patent
Naik et al.

(10) Patent No.: US 9,075,722 B2
(45) Date of Patent: Jul. 7, 2015

(54) CLUSTERED AND HIGHLY-AVAILABLE WIDE-AREA WRITE-THROUGH FILE SYSTEM CACHE

(71) Applicant: International Business Machines Corporation, Armonk, NY (US)

(72) Inventors: Manoj P. Naik, San Jose, CA (US); Frank B. Schmuck, Campbell, CA (US); Anurag Sharma, Mountain View, CA (US); Renu Tewari, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 260 days.

(21) Appl. No.: 13/864,313

(22) Filed: Apr. 17, 2013

(65) Prior Publication Data
US 2014/0317359 A1    Oct. 23, 2014

(51) Int. Cl.
  *G06F 17/30* (2006.01)
  *G06F 15/16* (2006.01)
  *G06F 15/00* (2006.01)
  *G06F 12/08* (2006.01)

(52) U.S. Cl.
  CPC ...... *G06F 12/0815* (2013.01); *G06F 17/30115* (2013.01); *G06F 17/30132* (2013.01); *G06F 17/30067* (2013.01); *Y10S 707/00* (2013.01); *Y10S 707/99941* (2013.01); *Y10S 707/99931* (2013.01)

(58) Field of Classification Search
  CPC ............... G06F 17/30115; G06F 17/30132; G06F 17/30067; Y10S 707/00; Y10S 707/99931; Y10S 707/99941
  USPC ................................................. 707/615, 822
  See application file for complete search history.

(56) References Cited

U.S. PATENT DOCUMENTS

| 5,828,876 | A  | * | 10/1998 | Fish et al. ........................... 1/1 |
| 6,192,432 | B1 |   | 2/2001  | Slivka et al. |
| 8,788,474 | B2 | * | 7/2014  | Whitehouse .................. 707/704 |
| 8,788,760 | B2 | * | 7/2014  | DeCusatis et al. ............ 711/141 |
| 2008/0046538 | A1 |   | 2/2008 | Susarla et al. |
| 2012/0215970 | A1 |   | 8/2012 | Shats |

OTHER PUBLICATIONS

Chen, PM. et al.; "The Rio file cache: surviving operating system crashes": SIGPLAN Notices, vol. 31, No. 9, pp. 74-83, Sep. 1996.

(Continued)

*Primary Examiner* — Cheryl Lewis
(74) *Attorney, Agent, or Firm* — Patricia B. Feighan

(57) ABSTRACT

A method for accessing data stored in a distributed caching storage system containing a home cluster and a secondary cluster is provided. A first copy of a file is stored on the home cluster and a second copy of the file is stored on the secondary cluster. The second copy of the file is associated with an inode data structure having a consistency attribute. An input/output request is received directed to the file and indicates that file is in an inconsistent state by updating the inode's consistency attribute. The first copy and the second copy of the file is updated according to the received input/output request and it is determined whether the first copy and the second copy were updated successfully. The maintaining of the inode's consistency attribute is indicative of the inconsistent state of the file.

20 Claims, 6 Drawing Sheets

(56) References Cited

OTHER PUBLICATIONS

IBM; "A method to use locking to ensure data integrity in a recoverable data processing system in a highly available enviornment"; http://www.ip.com/pubview/IPCOM000183397D; May 21, 2009.

Demeter, A. et al.; "Configuring Highly Available p609 Clusters Using HACMP 4.5"; IBM Corporation Corporation, www.ibm.com/redbooks/redp0218; Jul. 2002.

* cited by examiner

CLUSTERED AND HIGHLY-AVAILABLE WIDE-AREA WRITE-THROUGH FILE SYSTEM CACHE

BACKGROUND

The present invention relates to data caching in geographically distributed file systems.

Distributed wide-area file-caching products allow enterprises to easily make data available across geographically dispersed locations. These systems usually comprise a central "home" file system cluster, and a set of "secondary", i.e., "cache" file system clusters. The "home" cluster contains the master copy of all the files and directories, and the secondary, i.e., cache file system clusters essentially cache copies of files from the home cluster. This caching occurs when an operation is performed on a file in the secondary, i.e., cache file system cluster.

In the cache cluster, cache misses on read operations (e.g. read( ) or fstat( ) must be handled synchronously, i.e. the caller is blocked until sufficient data has been fetched from the home site. However, modifications to the file system namespace or file content can be pushed from the cache site to the home site in either a synchronous (write-through) or asynchronous (write-back) fashion.

Existing state-of-the-art "write-through file caching" products invalidate the home copy of the file when it is modified on the cache site. In existing "write-through file caching products" when a modification occurs, the cache site's file system discards the locally cached copy of the file, and performs the write operation directly on the home site. Then, a subsequent read operation issued by the application on the cache site causes the file to be re-cached from the home site. Therefore, even though the write committed successfully from the application's perspective, the file may become unavailable, if the home site fails or if the cache site becomes disconnected from the home, since the file is not re-cached locally until the next read. Furthermore, read operations that follow a write, actually incur write-amplification, due to the re-caching of the file.

BRIEF SUMMARY

A method for accessing data stored in a distributed caching storage system containing a home cluster and a secondary cluster is provided. A first copy of a file is stored on the home cluster and a second copy of the file is stored on the secondary cluster. The second copy of the file is associated with an inode data structure having a consistency attribute. An input/output request is received directed to the file and indicates that file is in an inconsistent state by updating the inode's consistency attribute. The first copy and the second copy of the file is updated according to the received input/output request and it is determined whether the first copy and the second copy were updated successfully. The maintaining of the inode's consistency attribute is indicative of the inconsistent state of the file.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
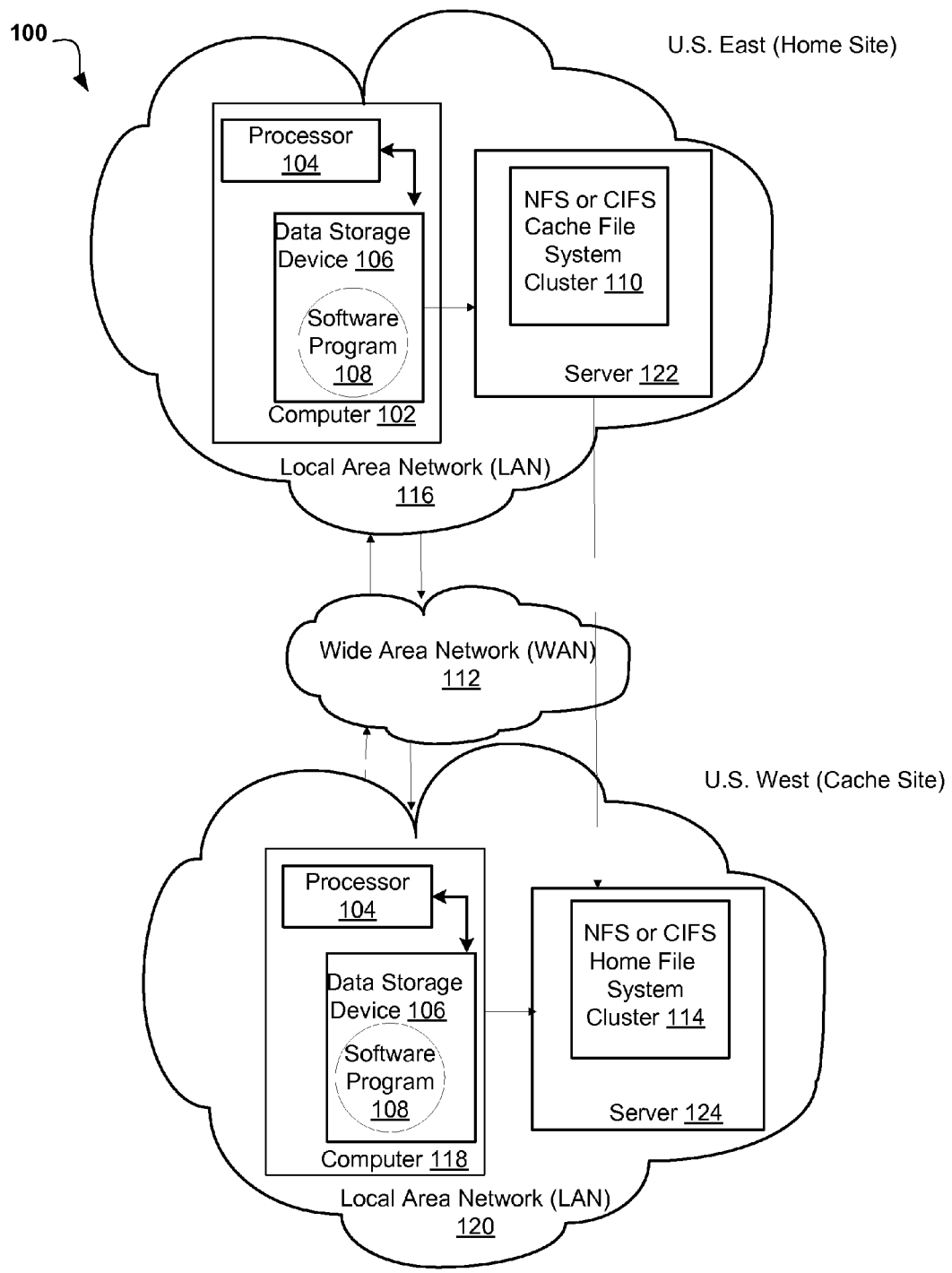
FIG. 1 illustrates a networked computer environment in which embodiments of the present invention may be practiced.

A typical distributed file system comprises a plurality of clients and servers interconnected by a Local Area Network (LAN) or Wide Area Network (WAN). The sharing of files across such networks has evolved over time. The simplest form of sharing data allows a client to request files from a remote server, also known as a home cluster. Data is then sent to the client and any changes or modifications to the data are returned to the home cluster.

Distributed file systems improve the efficiency of processing of distributed files by creating a file cache at each client location that accesses server data. The home cluster contains the master copy of all the files and directories, and the client file system, also known as a secondary file system, clusters essentially cache copies of files from the home cluster. This cache is referenced by client applications and only a cache miss may cause data to be fetched from the home cluster. Caching of data reduces network traffic and speeds response time at the client location. However, since multiple caches might exist in the system, it is imperative to ensure that cache coherency is maintained. The cached data should be updated when the data stored on the server is changed by another node in the network after the data was loaded into the cache. However, a system or network failure may prevent the cached data from being updated or the server data from being accessible prior to the first read and then write on the caching client. As such, there is greater potential for cache inconsistency.

Currently, geographically distributed caching file systems cluster cache data from the home site via Network File System (NFS) or Common Internet File System (CIFS). Caching sites are generally readers with a few sites being writers. Typically, when a write request is issued, it is only written to the home site. The caching site is established upon the first read from the home site wherein the data is fetched from the home site and stored on the cache site. However, a system or WAN failure may prevent the caching site from being updated or the home site being accessible prior to the first read and then write on the caching site. As such, there is greater potential for inconsistency between the home site and the caching site. Furthermore, it is extremely difficult in the current environment to simultaneously write to the home site and the caching site since there may be a system or WAN failure prior to both writes succeeding. It becomes very difficult to determine if the write succeeded or failed on both sites. All these issues can cause a problem with data integrity in the distributed caching file system.

The following described exemplary embodiments provide a system, method and program product to update both a remote copy and local copy of a file. Currently, when a write request is issued, the write is only applied to the home site and the remote cache copy is deleted from the cache site. After a successful write on the home site, a subsequent read from the cache site would cause data to be read remotely from the home site. After the first remote read is performed on the cache site, data is copied to the cache site from the home site and is stored locally on the cache site for subsequent reads. This may result in slower initial reads from the remote site since data is not stored locally until it is fetched from the home site upon the first read. It may also result in data being inaccessible from the home site should a network failure occur.

For example, if a network connection failure were to occur after a successful write to the home site, but prior to the first read from the cache site, data would not be able to be read from the cache site until network connectivity was restored and a retrieval of data from the home site could be performed. As such, it may, therefore, be advantageous to have efficient access to file system content that is read heavy, but needs to be accessed at geographically distributed locations. Locally cached data would be available for at least read requests, if the WAN connection or the home site fails.

Furthermore, it may, therefore, be advantageous to provide a data storage system that may write the data at the home site and the cache site whenever a write request is issued at the cache site. In a certain embodiment, after a write request is issued at the cache site, the file will be updated in parallel on the home and cache sites. The data storage system described herein may store references to all files to facilitate writing to and reading each file. These references may include metadata structures called identification nodes (inodes). Notably, each file may have an associated inode. The inode attached to the file may be used to track the consistency of the file on both the home and cache sites.

According to another aspect of the present embodiment, a write-ahead log (WAL) may be used to keep track of any modifications that have taken place on the home site and cache site. In a data storage system using WAL, all modifications are written to a log before they are applied. Both the redo and undo information may be stored in the log. One advantage of having the data written to both the home and the cache site is that the data will always be available locally, whether reading from the home site or the cache site, regardless of whether there is a successful network connection. Another advantage of having the data stored locally at both the home site and the cache site is that it is much faster to perform the first read from the cache site without having to fetch it from the home site first. Yet another advantageous aspect provides a current backup of data for availability and security purposes since the file will be stored locally both at the home site and at the cache site.

Referring to FIG. 1, an exemplary networked computer environment 100 is depicted in which various embodiments of the present invention may be practiced. The networked computer environment 100 may include a plurality of LANs 116 and 120 (only two of which are shown), client computers 102 and 118 and server computers 122 and 124 interconnected by corresponding LANs 116 and 120. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with server computer 122 via the LAN 116. Similarly, the client computer 118 may communicate with server computer 124 via the LAN 120. The server computer 122 may communicate with server computer 124 via WAN 112. Networks 112, 116 and 120 may include connections, such as wire, wireless communication links, or fiber optic cables. As will be discussed with reference to FIG. 4, server computers 122 and 124 may include internal components 800a, 800b and external components 900a, 900b, respectively, and client computers 102 and 118 may include internal components 800c, 800d and external components 900c, 900d, respectively. Client computers 102 and 118 may be, for example, a mobile device, a telephone, a personal digital assistant, a netbook, a laptop computer, a tablet computer, a desktop computer, or any type of computing devices capable of issuing an input/output (I/O) request.

An application program, such as software program 108 may run on the client computers 102 and 118 and may be programmed to issue an I/O request, such as, a write request or a read request to access data stored on the server computers 122 and 124. The server computer 124 may be programmed to execute a write-through file system cache program 204 (FIG. 2) to write the data on a cache site. For illustrative purposes, the home site may be on the east coast and the cache site may be on the west coast. For example, a caller using an application running on a client computer may issue a write request from client computer 118 on the cache site, which may access server computer 124 on the cache site via the LAN 120. The server computer 124 may then execute the write-through file system cache program 204 to check the consistency of the file, i.e. whether the cache copy and the home copy are the same, update the WAL and then write the data on the home site and the cache site. Additionally, a caller program, such as software program 108, running locally at client computer 118 on the cache site may issue a read request. Then client computer 118 on the cache site may access server computer 124 on the cache site via the LAN 120. The write-through file system cache program 204 running on server computer 124 on the cache site may retrieve the file if the file is in a consistent state. Thus, the write-through file system cache program 204 may perform a local read of the file or it may access server computer 122 on the home site via WAN 112, if needed, to copy the file to server computer 124 on the cache site so a local read may then be made. The read and write operations as performed by the write-through file system cache program 204 on server computer 124 are explained in more detail below with respect to FIGS. 3A-3C.

Figure 2:
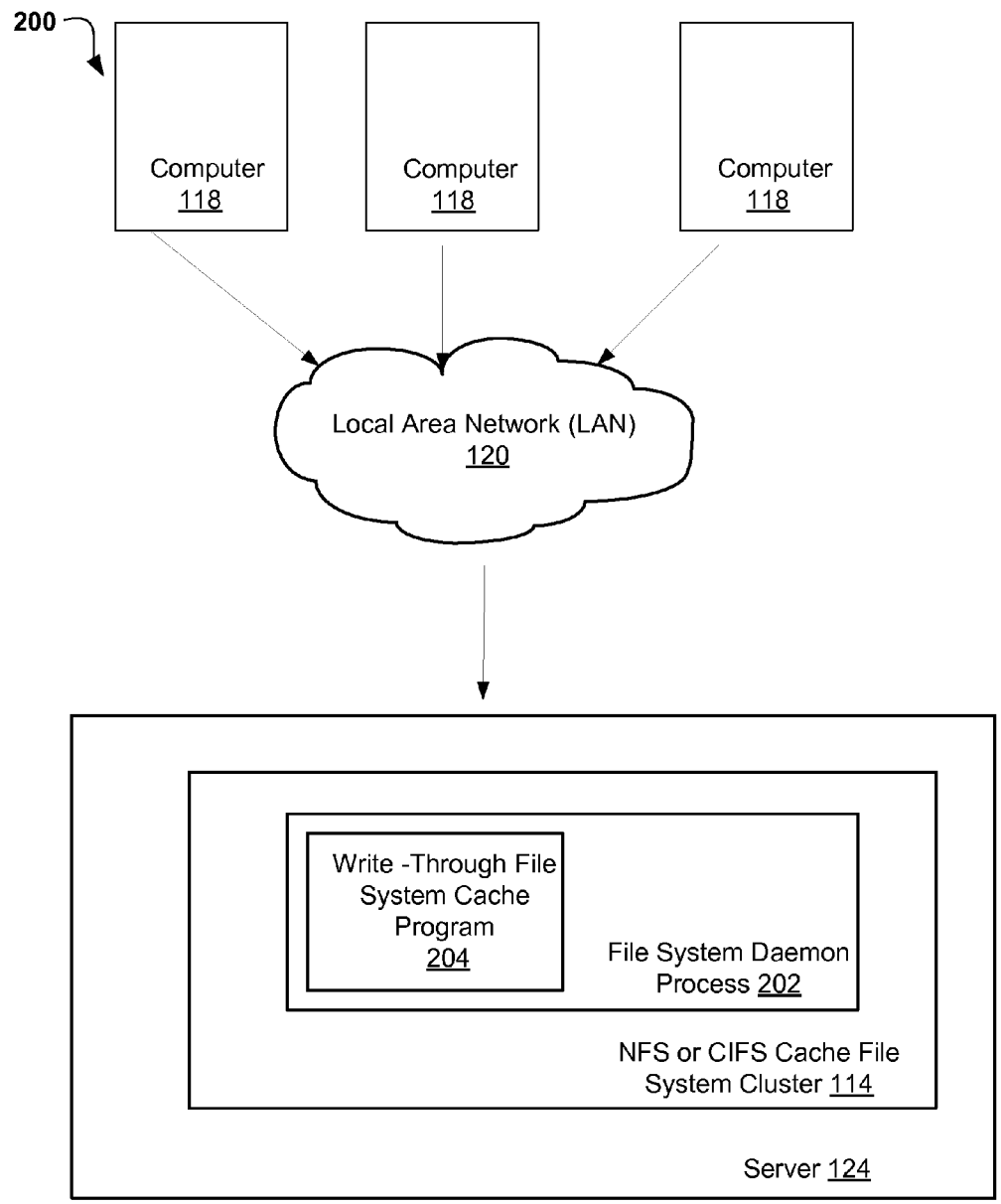
FIG. 2 illustrates a networked computer environment with an exemplary caching site server in accordance with an embodiment of the present invention.

In FIG. 2, a networked computer environment with an exemplary caching site server is illustrated, in accordance with an embodiment of the present invention. Client computer 118 communicates with server computer 124 via LAN 120. The server computer 124 is running a protocol which may include either a network file system (NFS) or common internet file system (CIFS) cache file system cluster 114. Users may access the file system cluster 114 via the protocol NFS or CIFS. The cache file system cluster 114 may run a background file system process, i.e., a daemon process 202. In an embodiment of the present invention, the write-through-file system cache program 204 runs on the daemon process 202. According to an embodiment of the present invention, the write-through file cache program 204 is a modification to the caching file system cluster 114. With respect to the example above, a caller, such as software program 108 (shown in FIG. 1) may issue a read or write request from client computer 118 on the cache site which may access server computer 124 on the cache site via the LAN 120. The server computer 124 may then execute the write-through file system cache program 204 to read or write the data on the cache site. The write-through file system cache program 204 runs in the background and may be executed automatically once the write request is issued.

Currently, when a write request is issued by a caller program, such as software program 108 running on a client computer, such as client computer 118, the client computer 118 accesses a server, such as server computer 124. The copy of data on server computer 124 at the cache site would be deleted and data would be written to the server computer 122 at the home site. Upon the first read of data on the cache site, server computer 124 would retrieve data from the home site on server computer 122 and copy it locally to server computer 124 on the cache site. If a network failure were to occur with respect to the WAN 112 prior to the data being stored on server computer 124 at the cache site, the caller programs would be unable to retrieve any data. As such, it may be advantageous to have data written on both the home site and the cache site. For example, if the WAN 112 would experience a network failure, the caller programs on the cache site would be able to access a locally stored copy of data on server computer 124 without having to access server computer 122 on the home site via the WAN 112 prior to the first read of the data.

Figure 3A:
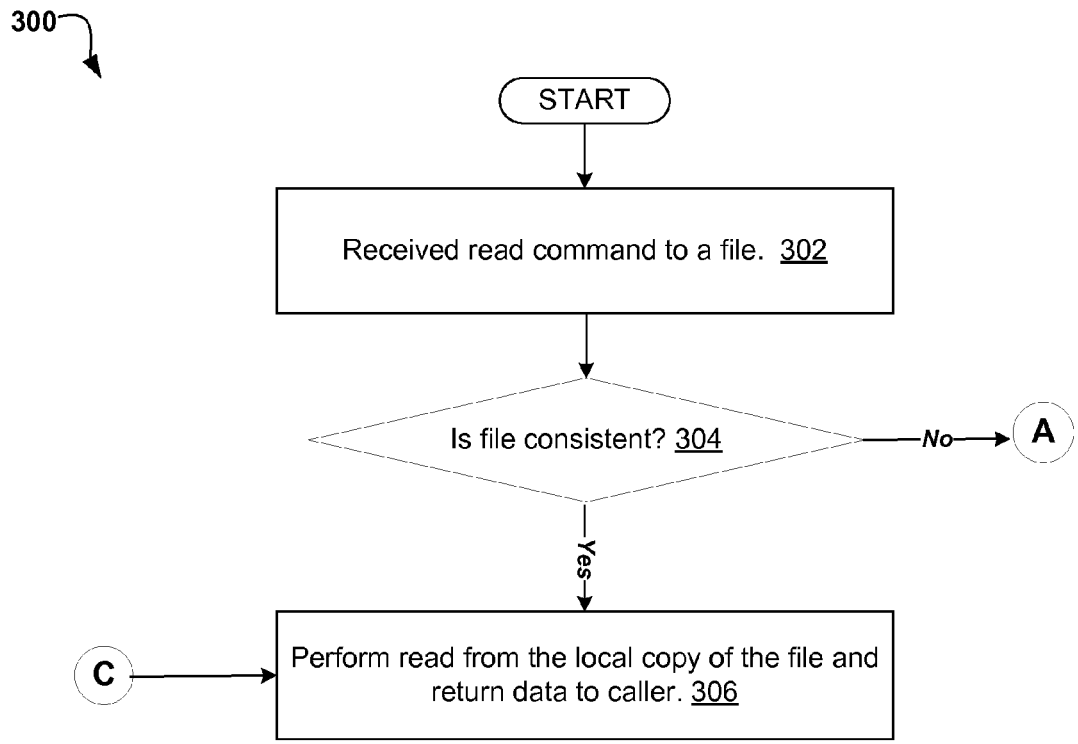
FIGS. 3A-3C is a flowchart illustrating the steps carried out by a write-through file cache program in accordance with an embodiment of the present invention.
Figure 3B:
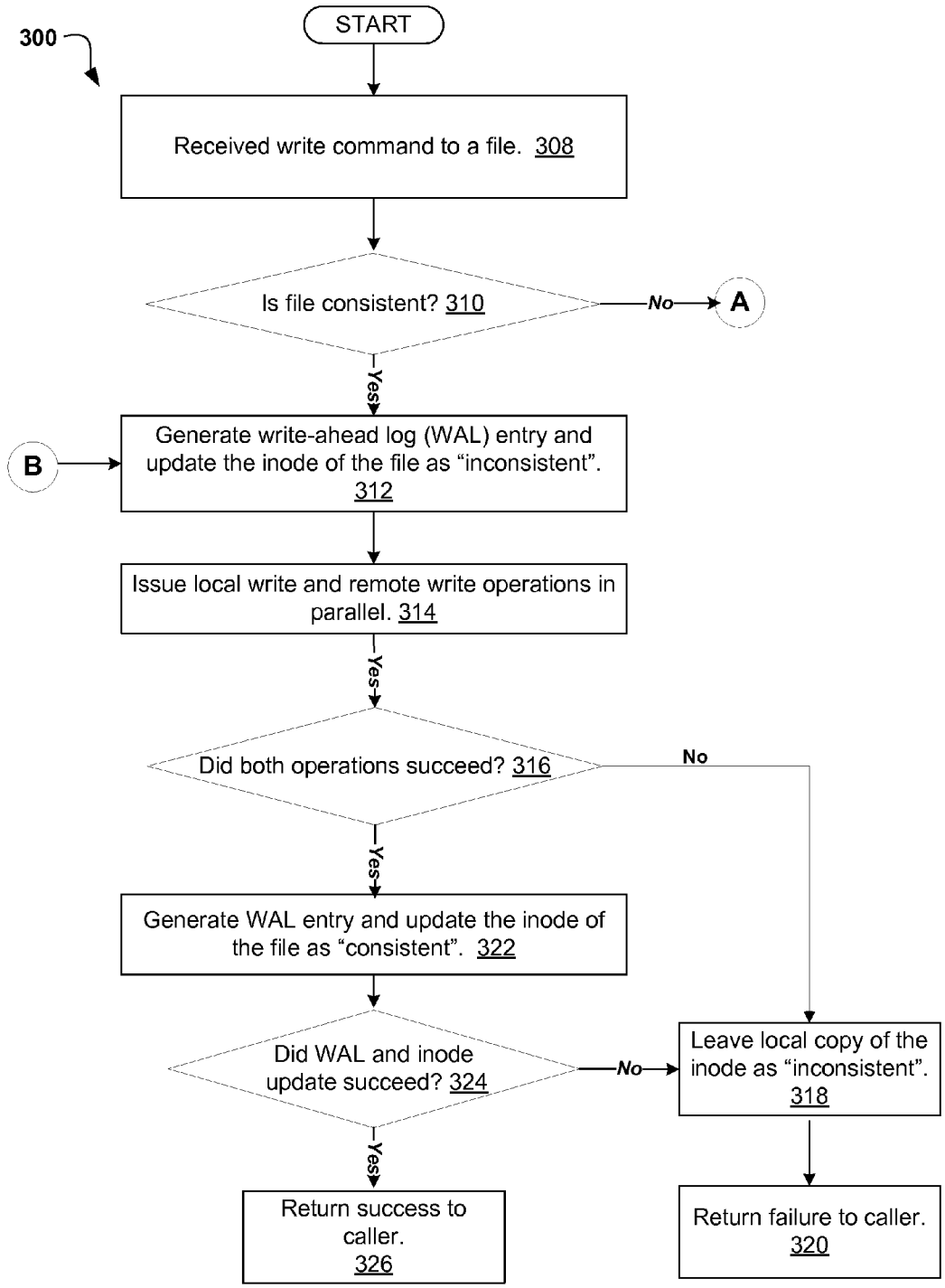
Figure 3C:
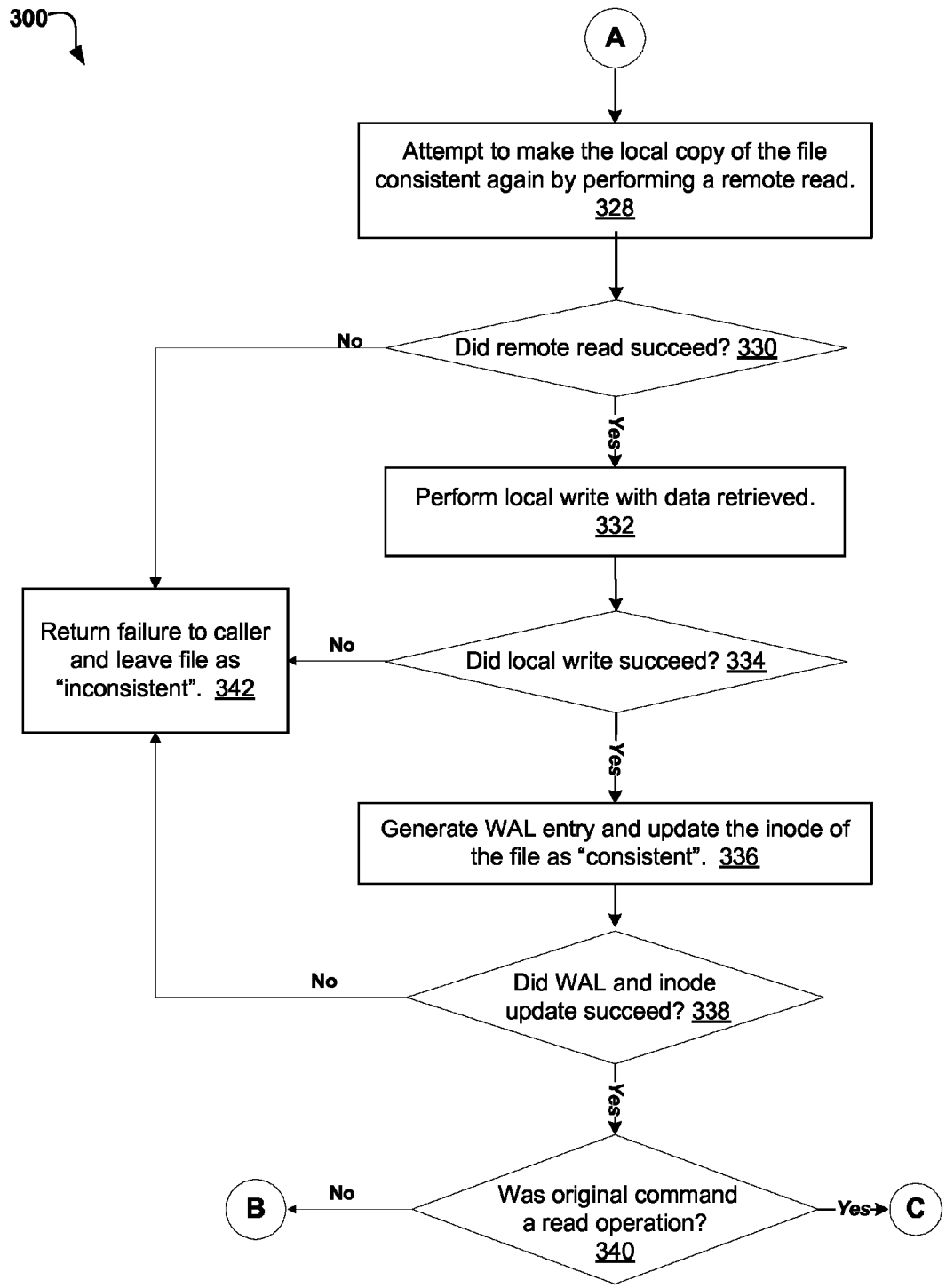

FIGS. 3A-3C is a flowchart illustrating the steps carried out by the write-through file system cache program 204 in accordance with an embodiment of the present invention. The embodiment incorporates the use of an inode data structure attached to the file and a write-ahead log (WAL) for crash recovery purposes as described in further detail below. Flowchart 300 may be described with the aid of the system architectures 100 shown in FIGS. 1 and 200 shown in FIG. 2. Referring to FIG. 3A, at 302, the client computer 118 at the cache site may receive an I/O request, such as a read request to read a file. For example, client computer 118 may be located at a cache site, and the software program 108, running on the client computer 118, may issue a read request directed to a file. Then client computer 118 may access server computer 124 via the LAN 120 and, at 304, the write-through file system program 204, located on server 124, may check to see if the file is consistent.

A file is deemed consistent when the local copy of the file and the remote copy of the file are the same, i.e., the copy of the file on the cache site server is the same as the copy on the home site server. In an embodiment, consistency of a file may be determined by reading the inode attached to the file. Every file has an inode associated with it. An inode data structure stores metadata, i.e., attributes describing a file, such as creation time, permissions, etc. The present embodiment may store the consistency or inconsistency of the file in an attribute of the inode associated with the file. For example, if a caller program issues a read request on the cache site from local client computer 118, then client computer 118 will access local server computer 124 via the LAN 120. Then the write-through cache file system program 204 running on computer server 124 will check the inode associated with the corresponding file to determine if the file is in either a consistent or inconsistent state. If the inode attribute associated with the file on local server computer 124 indicates a consistent state, i.e., the same as the copy on the home site, then a read is performed from the local copy of the file on server computer 124 on the cache site and data is returned to the caller software program 108, at 306. As such, the caller software program 108 in the previous example would be able to read the file locally from server computer 124 on the cache site without having to access the file on server computer 122 on the home site via the WAN 112.

Referring to FIG. 3C, if at 304 the file on server computer 124 is determined to be inconsistent by the write-through file system program 204, then an attempt will be made to make the local copy of the file consistent by performing a remote read from server computer 122 on the home site, at 328. For example, the write-through cache file system program 204 running on server computer 124 will check the inode associated with the file to determine if the file is consistent or inconsistent. If the inode attribute is indicative of an inconsistent state, then the write-through cache file system program 204 running on server computer 124 on the cache site will access server computer 122 on the home site via WAN 112 in attempt to retrieve the file from server computer 122 so a remote read may be performed.

At 330, the write-through file system program 204 determines whether the remote read was successful from server 122 on the home site. If the remote read failed, then the caller software program 108 would receive a failure message and the inode associated with the file would remain as inconsistent, at 342. With respect to the example above, if the write-through cache file system program 204 running on server computer 124 on the cache site accessed server computer 122 on the home site via WAN 112 and was unsuccessful in retrieving the file from server computer 122 on the home site, then, at 342, the write-through cache file system program 204 running on server computer 124 on the cache site may return a failure message to the caller and the inode attribute associated with the file on server computer 124 would remain as inconsistent.

If, at 330, the write-through cache file system program 204 determines that the remote read was successful, then, at 332, an attempt may be made to write the retrieved copy of the file locally onto the server computer 124 on the cache site. Referring to the example above, if the write-through cache file system program 204 running on server computer 124 on the cache site accessed server computer 122 on the home site via WAN 112 and was successful in retrieving the copy of the file from server computer 122 on the home site 330, then the write-through cache file system program 204 running on server computer 124 on the cache site would attempt to write the file to server computer 124 on the cache site at 332, in order to make both copies of the file substantially identical.

At 334, the write-through cache file system program 204 determines whether the writing of the file locally to server computer 124 was successful. If it was not successful, then a failure message is returned to the caller software program 108 and the inode attribute is left as inconsistent, at 342. Regarding the above example, the write-through cache file system program 204 running on server computer 124 on the cache site may attempt to write the copy of the file retrieved from server computer 122 on the home site to server computer 124 on the cache site 332 and if the write was not successful at 334, then the write-through cache file system program 204 running on server computer 124 on the cache site would return a failure message to the caller and the inode attribute associated with the file on server computer 124 would remain as inconsistent, at 342.

If the writing of the file locally has succeeded, at 332, then the write-through cache file system program 204 may generate a write-ahead log (WAL) entry which may describe the performed operation and the inode attribute would be marked as consistent, at 336. A WAL, as used hereinafter, is a log located in the NFS or CIFS cache file system cluster 114 where all modifications are written to before they are applied. Usually both redo and undo information is stored in the WAL. The WAL is useful for crash recovery purposes since the WAL entry is written first, before the file's inode is updated. Therefore, if there is a failure before the inode is updated, the WAL entry contains the necessary information to redo the inode entry upon recovery. For example, server computer 124 may be in the middle of performing the writing of the file copy locally when there is a loss of power. Upon restart, it may be beneficial for the write-through file system cache program 204 running on server computer 124 to know whether the operation it was performing succeeded, half-succeeded, or failed. If a WAL were used, the write-through file system cache program 204 could check this log and compare what it was supposed to be doing when the corresponding server unexpectedly lost power to what was actually done. On the basis of this comparison, the write-through file system cache program 204 could decide to undo what it had started, complete what it had started, or keep things as they are.

At 338, it is determined whether the WAL and inode updates succeeded. If both operations did not both succeed, then a failure message would be returned to the caller software program 108, at 342. For example, if the write-through file system cache program 204 running on server computer 124 determines that the WAL and/or inode was not successfully updated on server computer 124 on the cache site, then the write-through file system cache program 204 would leave the attribute of the inode associated with the file on server computer 124 marked as inconsistent and return a failure message to the caller, at 342.

If it is determined that the WAL and inode updates did succeed (yes branch of 338), then at 340, it is determined whether the original request was a read request. If it was not a read request, then a corresponding WAL entry is generated and the inode of the file is updated as inconsistent, at 312 (FIG. 3B). Next, an attempt is made to write the file in parallel to both the home site and the cache site.

With respect to the example above, the write-through file system cache program 204 running on server computer 124 would determine if the WAL and inode updates succeeded at 338. If the updates did succeed at 338, then the write-through file system cache program 204 running on server computer 124 would determine whether the original request was a read request, at 340. If the write-through file system cache program 204 running on server computer 124 determines that the original request was not a read request, then the write-through file system cache program 204 generates a WAL entry on server computer 124 and the inode associated with the file on server computer 124 is updated as inconsistent, at 312 (FIG. 3B). Next an attempt is made to write the file in parallel to both the home site and the cache site by following the steps 314 to 326 (FIG. 3B), which are explained in detail below.

If at 340, it is determined the original request was a read request, then a read of the file is performed from the local copy and the data is returned to the caller software program 108, at 306 (FIG. 3A). For example, if, at 340, the write-through file system cache program 204 running on server computer 124 determines that the original request was a read request then the read is performed from the local copy of the file on server computer 124 on the cache site and the data is returned to the caller software program 108, at 306. As such, the caller in the previous example would be able to read the file locally from server computer 124 on the cache site without having to access the file on server computer 122 on the home site via the WAN 112.

Referring to FIG. 3B, a caller program may issue a write request to a file, at 308. For example, the client computer 118 at the cache site may issue a write request to a file, at 308. In this example, client computer 118 is located on the cache site and a local caller issues a write request to the file. At 310, the write-through file system program 204 located on server computer 124 will check to see if the file is consistent. As previously explained, a file is deemed consistent when the local copy of the file and the remote copy of the file are the same. In an embodiment of the present invention, consistency of a file may be determined by reading the inode associated with the file to see if it is consistent or inconsistent. For example, if a caller software program 108 issues a write request on the cache site from local client computer 118, then client computer 118 will access local server computer 124 via the LAN 120 and the write-through file system cache program 204 running on server computer 124 would check the inode associated with the file to determine if the attribute is consistent or inconsistent, at 310.

If, at 310, the write-through file system cache program 204 determines that the file on local server computer 124 is inconsistent, then the previously described steps of FIG. 3C may be performed to attempt to make both copies of the file consistent. With respect to the example above, the caller software program 108 on the cache site may issue a write request from client computer 118. Client computer 118 would then access server 124 via the LAN 120.

If, at 310, the write-through file system cache program 204 determines that the file is consistent, then the WAL entry would be made on server computer 124 on the cache site noting that the file is to be updated and the inode attribute would be changed to inconsistent, at 312. As previously explained a WAL is a log located in the NFS or CIFS cache file system cluster 114 where all modifications are written to before they are applied. Usually both redo and undo information is stored in the log. The WAL is useful for crash recovery purposes since the WAL entry is written first, before the file's inode is updated. With respect to the example above, once the write-through file system cache program 204 running on server computer 124 determines that the file on server computer 124 is consistent, at 310, the write-through file system cache program 204 running on server computer 124 may generate the WAL entry on server computer 124 to reflect that a write request is to be performed. Additionally, the write-through file system cache program 204 on server computer 124 may update the inode associated with the file on server computers 124 by changing the attribute to inconsistent, at 312.

At 314, an attempt may be made to write to the copy of the file on server computer 122 at the home site and to the copy of the file on server computer 124 at the cache site, in any order. For example, the write-through file system cache program 204 running on server computer 124 would issue write requests to computer servers 124 and 122. Therefore, the write-through file system cache program 204 running on server computer 124 would attempt to update both copies of the file stored, respectively, on the server computer 124 on the cache site and the server computer 122 on the home site.

Then, at 316, a determination is made as to whether the write operation succeeded both at the home site and at the cache site. If the write operation did not succeed at both locations then, at 318, the inode of the local copy of the file may be maintained as inconsistent and a failure message may be returned to the caller software program 108 at 320. For example, if the write-through file system cache program 204 running on server computer 124 determines that the file was not successfully written to on both server computer 122 on the home site and server computer 124 on the cache site, then the write-through file system cache program 204 running on server computer 124 may generate the WAL entry on server computer 124 to reflect that a write request had not succeeded. Additionally, the write-through file system cache program 204 running on server computer 124 may leave the inode associated with the file on server computer 124 as inconsistent 318 and return a failure message to the caller, at 320.

If the write operation successfully updated copies of the file at both the home and cache locations, then, at 322, the WAL entry would be made noting that the file was written and the inode attribute would be marked as consistent. For example, if the write-through file system cache program 204 running on server computer 124 determines that the file was successfully updated on both server computer 122 on the home site and server computer 124 on the cache site, then the write-through file system cache program 204 running on server computer 124 may generate the WAL entry on server computer 124 to reflect that a write request had succeeded. Additionally, the write-through file system cache program 204 running on server computer 124 may update the inode associated with the file on server computer 124 to change the attribute to indicate that the file is now in a consistent state.

At 324, it may be determined whether the WAL and inode updates succeeded. If the updates did not succeed then the inode of the local copy of the file may be left as inconsistent, at 318, and a failure message may be returned to the caller software program 108, at 320. For example, if the write-through file system cache program 204 running on server computer 124 determines that WAL and inode entries were not successfully updated on server computer 124 on the cache site, then the write-through file system cache program 204 running on server computer 124 may leave the attribute of the inode associated with the file marked as inconsistent, at 318, and may return a failure message to the caller software program, at 320.

If, at 324, the write-through file system cache program 204 running on server computer 124 determines that the WAL and inode updates did succeed, a successful write operation notification message would be returned to the caller software program 108, at 326. For example, if the write-through file system cache program 204 running on server computer 124 determines that WAL and inode were successfully updated on server computer 124 on the cache site, then the write-through file system cache program 204 running on server computer 124 would return to the caller a notification message indicating a successful write operation, at 320.

In a certain embodiment, after a write request is issued at the cache site, both copies of the file may be updated in parallel on the home and cache sites. The data storage system described herein may store references to all files to facilitate writing to and reading each file. As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable tangible storage devices having computer readable program code embodied thereon.

Figure 4:
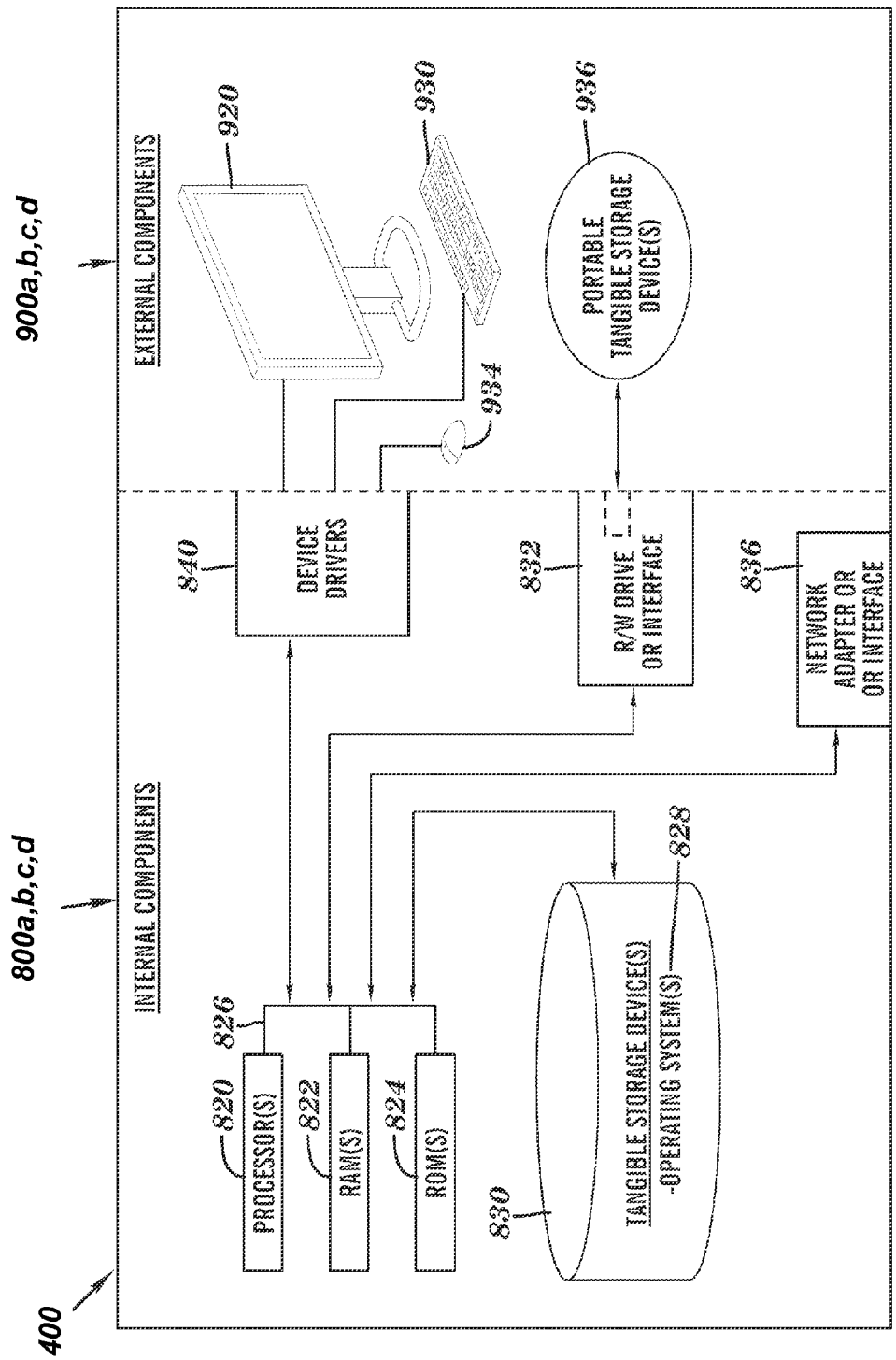
FIG. 4 is a block diagram of internal and external components of computers depicted in FIG. 1 in accordance with an illustrative embodiment of the present invention.

FIG. 4 is a block diagram of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computers 102 and 118, and network server computers 122 and 124 include respective sets of internal components 800 a, b, c, d and external components 900 a, b, c, d illustrated in FIG. 4. Each of the sets of internal components 800 a, b, c, d includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and program 108 in client computer 102 or 118 and program 204 in network server 124 are stored on one or more of the respective computer-readable tangible storage devices 830 for execution by one or more of the respective processors 820 via one or more of the respective RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 a, b, c, d also includes a R/W drive or interface 832 to read from and write to one or more portable computer-readable tangible storage devices 936 such as a CD-ROM, DVD, memory stick, magnetic tape, magnetic disk, optical disk or semiconductor storage device. The write-though file cache system program 204 in server computer 124 can be stored on one or more of the respective portable computer-readable tangible storage devices 936, read via the respective R/W drive or interface 832 and loaded into the respective hard drive 830.

Each set of internal components 800 a, b, c, d also includes network adapters or interfaces 836 such as a TCP/IP adapter cards, wireless wi-fi interface cards, or 3G or 4G wireless interface cards or other wired or wireless communication links. The program 108 in client computer 102 and 118 and program 204 in network server 124 can be downloaded to respective client computers 102 and 118 and network server 124 from an external computer via a network (for example, the Internet, a local area network or other, wide area network) and respective network adapters or interfaces 836. From the network adapters or interfaces 836, the program 108 in client computer 102 and 118; program 204 in network server computer 124 are loaded into the respective hard drive 830. The network may comprise copper wires, optical fibers, wireless transmission, routers, firewalls, switches, gateway computers and/or edge servers.

Each of the sets of external components 900 a, b, c, d can include a computer display monitor 920, a keyboard 930, and a computer mouse 934. External components 900 a, b, c, d can also include touch screens, virtual keyboards, touch pads, pointing devices, and other human interface devices. Each of the sets of internal components 800 a, b, c, d also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Aspects of the present invention have been described with respect to block diagrams and/or flowchart illustrations of methods, apparatus (system), and computer program products according to embodiments of the invention. It will be understood that each block of the flowchart illustrations and/or block diagrams, and combinations of blocks in the flowchart illustrations and/or block diagrams, can be implemented by computer instructions. These computer instructions may be provided to a processor of a general purpose computer, special purpose computer, or other programmable data processing apparatus to produce a machine, such that instructions, which execute via the processor of the computer or other programmable data processing apparatus, create means for implementing the functions/acts specified in the flowchart and/or block diagram block or blocks.

The aforementioned programs can be written in any combination of one or more programming languages, including low-level, high-level, object-oriented or non object-oriented languages, such as Java, Smalltalk, C, and C++. The program code may execute entirely on the user's computer, partly on the user's computer, as a stand-alone software package, partly on the user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet service provider). Alternatively, the functions of the aforementioned programs can be implemented in whole or in part by computer circuits and other hardware (not shown).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The foregoing description of various embodiments of the present invention has been presented for purposes of illustration and description. It is not intended to be exhaustive or to limit the invention to the precise form disclosed. Many modifications and variations are possible. Such modifications and variations that may be apparent to a person skilled in the art of the invention are intended to be included within the scope of the invention as defined by the accompanying claims.

What is claimed is
1. A method, executed by a computing device, for accessing data stored in a distributed caching storage system containing a home cluster and a secondary cluster, the method comprising:
   storing a first copy of a file on the home cluster and storing a second copy of the file on the secondary cluster, the second copy of the file is associated with an inode data structure having a consistency attribute;
   receiving an input/output (110) request directed to the file;
   indicating that the file is in an inconsistent state by updating the inode's consistency attribute;
   updating the first copy and the second copy of the file according to the received I/O request;
   determining whether the first copy and the second copy have been updated successfully;
   indicating that the file is in a consistent state by resetting the inode's consistency attribute in response to the determining that the first copy and the second copy have been updated successfully; and
   maintaining the inode's consistency attribute indicative of the inconsistent state of the file in response to determining that either the first copy of the file or the second copy of the file has not been updated successfully.

2. The method of claim 1, further comprising generating an entry in a write ahead log describing the I/O request, in response to receiving the I/O request.

3. The method of claim 2, further comprising updating the first copy of the file based on the write ahead log entry, in response to determining that the first copy has not been updated successfully, and indicating that the file is in a consistent state by resetting the inode's consistency attribute.

4. The method of claim 2, further comprising updating the second copy of the file based on the write ahead log entry, in response to determining that the second copy has not been updated successfully, and indicating that the file is in a consistent state by resetting the inode's consistency attribute.

5. The method of claim 1, further comprising:
   receiving another I/O request directed to the file;
   determining whether the inode's consistency attribute indicates the inconsistent state of the file;
   replacing the first copy of the file with the second copy of the file in response to determining that the inode's consistency attribute indicates the inconsistent state of the file and in response to determining that the first copy of the file has not been updated successfully; and
   indicating that the file is in a consistent state by resetting the inode's consistency attribute.

6. The method of claim 1, further comprising:
   receiving another I/O request directed to the file;
   determining whether the inode's consistency attribute indicates the inconsistent state of the file;
   replacing the second copy of the file with the first copy of the file in response to determining that the inode's consistency attribute indicates the inconsistent state of the file and in response to determining that the second copy of the file has not been updated successfully; and
   indicating that the file is in a consistent state by resetting the inode's consistency attribute.

7. The method of claim 1, wherein receiving the I/O request directed to the file comprises receiving a write request directed to the file.

8. The method of claim 7, further comprising transmitting a notification message indicating a failure to a sender of the I/O request, in response to determining that the first copy or the second copy has not been updated successfully.

9. The method of claim 1, wherein the I/O request conforms to either Network File System (NFS) protocol or Common Internet File System (CIFS) protocol.

10. The method of claim 1, wherein receiving the I/O request directed to the file comprises receiving a read request directed to the file.

11. A computer program product for accessing data stored in a distributed caching storage system containing a home cluster and a secondary cluster, the computer program product comprising a non-transitory computer readable storage medium having program code embodied therewith, the program code readable/executable by a processor to:
   store a first copy of a file on the home cluster and store a second copy of the file on the secondary cluster, the second copy of the file is associated with an inode data structure having a consistency attribute;
   receive an input/output (I/O) request directed to the file;
   indicate that the file is in an inconsistent state by updating the inode's consistency attribute;
   update the first copy and the second copy of the file according to the received 110 request;
   determine whether the first copy and the second copy have been updated successfully;
   indicate that the file is in a consistent state by resetting the inode's consistency attribute in response to determining that the first copy and the second copy have been updated successfully; and
   maintain the inode's consistency attribute indicative of the inconsistent state of the file in response to determining that either the first copy of the file or the second copy of the file has not been updated successfully.

12. The computer program product of claim 11, further comprising the program code to generate an entry in a write ahead log describing the I/O request, in response to receiving the I/O request.

13. The computer program product of claim 12, further comprising the program code to update the first copy of the file based on the write ahead log entry, in response to determining that the first copy has not been updated successfully, and indicating that the file is in a consistent state by resetting the inode's consistency attribute.

14. The computer program product of claim 12, further comprising the program code to update the second copy of the file based on the write ahead log entry, in response to determining that the second copy has not been updated successfully, and indicating that the file is in a consistent state by resetting the inode's consistency attribute.

15. The computer program product of claim 11, further comprising the program code readable/executable by a processor to:
   receive another I/O request directed to the file;
   determine whether the inode's consistency attribute indicates the inconsistent state of the file;
   replace the first copy of the file with the second copy of the file in response to determining that the inode's consistency attribute indicates the inconsistent state of the file and in response to determining that the first copy of the file has not been updated successfully; and
   indicate that the file is in a consistent state by resetting the inode's consistency attribute.

16. The computer program product of claim 11, further comprising the program code readable/executable by a processor to:

receive another I/O request directed to the file;
determine whether the inode's consistency attribute indicates the inconsistent state of the file;
replace the second copy of the file with the first copy of the file in response to determining that the inode's consistency attribute indicates the inconsistent state of the file and in response to determining that the second copy of the file has not been updated successfully; and
indicate that the file is in a consistent state by resetting the inode's consistency attribute.

17. The computer program product of claim 11, wherein receiving the I/O request directed to the file comprises receiving a write request directed to the file.

18. The computer program product of claim 17, further comprising transmitting a notification message indicating a failure to a sender of the I/O request, in response to determining that the first copy or the second copy has not been updated successfully.

19. The computer program product of claim 11, wherein the I/O request conforms to either Network File System (NFS) protocol or Common Internet File System (CIFS) protocol.

20. The computer program product of claim 11, wherein receiving the I/O request directed to the file comprises receiving a read request directed to the file.

* * * * *